(12) United States Patent
Samie et al.

(10) Patent No.: US 12,323,014 B2
(45) Date of Patent: Jun. 3, 2025

(54) MANAGING BEARING CURRENTS IN AN ELECTRIC MACHINE

(71) Applicant: GM GLOBAL TECHNOLOGY OPERATIONS LLC, Detroit, MI (US)

(72) Inventors: Farzad Samie, Franklin, MI (US); Peng Peng, Columbus, OH (US); Alireza Fatemi, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 311 days.

(21) Appl. No.: 18/152,885

(22) Filed: Jan. 11, 2023

(65) Prior Publication Data

US 2024/0235336 A1    Jul. 11, 2024

(51) Int. Cl.
  *H02K 11/40*    (2016.01)
(52) U.S. Cl.
  CPC .................................. *H02K 11/40* (2016.01)
(58) Field of Classification Search
  CPC . H02K 11/40; H02K 5/20; H02K 1/20; H02K 7/003; H02K 5/124

USPC ............................................................ 310/71
See application file for complete search history.

(56) References Cited

U.S. PATENT DOCUMENTS

| | | | | |
|---|---|---|---|---|
| RE38,673 E | * | 12/2004 | Elsasser | H02K 7/085 |
| | | | | 360/97.21 |
| 2018/0083509 A1 | * | 3/2018 | Yang | H01M 10/625 |
| 2018/0269743 A1 | * | 9/2018 | Büttner | F16J 15/3404 |
| 2019/0157947 A1 | * | 5/2019 | Reuter | H02K 7/003 |
| 2020/0036249 A1 | * | 1/2020 | Krais | H02K 9/197 |
| 2021/0143693 A1 | * | 5/2021 | Nehl | H02K 3/24 |

* cited by examiner

*Primary Examiner* — Terrance L Kenerly
*Assistant Examiner* — Theodore L Perkins
(74) *Attorney, Agent, or Firm* — CANTOR COLBURN LLP (57) ABSTRACT

An alternating current motor system includes a motor frame, a rotor including a rotor shaft, a stator including multi-phase AC stator windings, a power inverter producing a multi-phase AC voltage coupled to the multi-phase AC stator windings and at least one ohmic connection between the rotor shaft and the motor frame including a conductive fluid.

20 Claims, 5 Drawing Sheets

MANAGING BEARING CURRENTS IN AN ELECTRIC MACHINE

INTRODUCTION

The subject disclosure relates to rotary electric machines.

Multi-phase AC machines are known to exhibit substantial induced currents within the machine structures. Induced currents may undesirably arc discharge through machine bearings. Therefore, it is desirable to reduce or eliminate current arcing through the machine bearings.

SUMMARY

In one exemplary embodiment, an alternating current (AC) motor system may include a motor frame, a rotor including a rotor shaft, a stator including multi-phase AC stator windings, a power inverter producing a multi-phase AC voltage coupled to the multi-phase AC stator windings, at least one ohmic connection between the rotor shaft and the motor frame including a conductive fluid.

In addition to one or more of the features described herein, the at least one ohmic connection may include a first ohmic connection and a second ohmic connection located at respective opposite ends of the rotor shaft.

In addition to one or more of the features described herein, the conductive fluid may include one of a saline solution of water, a molten salt, a conductive nanofluid, and a liquid metal.

In addition to one or more of the features described herein, the at least one ohmic connection may include a sealing ring sealably engaged at a first end with the rotor shaft and at a second end with the motor frame and the conductive fluid, wherein the conductive fluid occupies a gap between the first end of the sealing ring and the second end of the sealing ring.

In addition to one or more of the features described herein, the at least one ohmic connection may include a first sealing ring having a respective inner surface and a respective outer surface and a second sealing ring having a respective inner surface and a respective outer surface, the first sealing ring and the second sealing ring disposed in spaced adjacency within a bore at an end of the rotor shaft and sealable engaged at respective outer surfaces with an inner surface of the bore, an electrically conductive tube electrically grounded to the motor frame and disposed through the first sealing ring and the second sealing ring and sealably engaged at respective inner surfaces of the first sealing ring and the second sealing ring, the conductive fluid, wherein the conductive fluid occupies a gap between the first sealing ring and the second sealing ring.

In addition to one or more of the features described herein, the electrically conductive tube is flared between the first sealing ring and the second sealing ring.

In addition to one or more of the features described herein, the AC motor system may further include an electrically conductive ring coupled to the conductive tube between the first sealing ring and the second sealing ring.

In addition to one or more of the features described herein, the rotor shaft may include a bolt threadedly engaged with a bore at an end of the rotor shaft, and wherein the sealing ring sealably engaged at the first end with the rotor shaft is sealably engaged with the bolt.

In addition to one or more of the features described herein, the bolt may include a head with a rounded perimeter surface, wherein the sealing ring sealably engaged with the bolt is sealably engaged with the rounded perimeter surface.

In addition to one or more of the features described herein, the bolt may include a head with a flange including a smooth engagement surface opposite the rotor shaft, wherein the sealing ring sealably engaged with the bolt is sealably engaged with the engagement surface.

In addition to one or more of the features described herein, the conductive fluid occupying the gap between the first end of the sealing ring and the second end of the sealing ring only partially fills the gap.

In addition to one or more of the features described herein, the conductive fluid occupying the gap between the first sealing ring and the second sealing ring only partially fills the gap.

In addition to one or more of the features described herein, the motor frame may include a closeout plate, and wherein the sealing ring sealably engaged at the second end with the motor frame is sealably engaged at the second end with the closeout plate.

In another exemplary embodiment, an electrified vehicle may include a battery pack, a traction power inverter module (TPIM) connected to the battery pack, and configured to change a direct current (DC) voltage from the battery pack to a multi-phase alternating current (AC) voltage, and a rotary electric motor energized by the multi-phase AC voltage from the TPIM over a multi-phase AC bus including a motor frame, a stator having multi-phase AC stator windings, a rotor, a rotor shaft connected to and surrounded by the rotor, and configured to rotate about an axis of rotation in conjunction with the rotor when the electric machine is energized, a transmission coupled to the rotor shaft and powered by the electric machine, and at least one ohmic connection between the rotor shaft and the motor frame including a conductive fluid.

In addition to one or more of the features described herein, the at least one ohmic connection may include a sealing ring sealably engaged at a first end with the rotor shaft and at a second end with the motor frame and the conductive fluid, wherein the conductive fluid occupies a gap between the first end of the sealing ring and the second end of the sealing ring.

In addition to one or more of the features described herein, the at least one ohmic connection may include a first sealing ring having a respective inner surface and a respective outer surface and a second sealing ring having a respective inner surface and a respective outer surface, the first sealing ring and the second sealing ring disposed in spaced adjacency within a bore at an end of the rotor shaft and sealable engaged at respective outer surfaces with an inner surface of the bore, an electrically conductive tube electrically grounded to the motor frame and disposed through the first sealing ring and the second sealing ring and sealably engaged at respective inner surfaces of the first sealing ring and the second sealing ring, and the conductive fluid, wherein the conductive fluid occupies a gap between the first sealing ring and the second sealing ring.

In addition to one or more of the features described herein, the electrically conductive tube may be flared between the first sealing ring and the second sealing ring.

In addition to one or more of the features described herein, the electrified powertrain may further include an electrically conductive ring coupled to the electrically conductive tube between the first sealing ring and the second sealing ring.

In addition to one or more of the features described herein, the at least one ohmic connection may include a first ohmic connection and a second ohmic connection located at respective opposite ends of the rotor shaft.

In yet another exemplary embodiment, a method of operating a multi-phase alternating current (AC) motor including a motor frame, a stator having a multi-phase winding, and a rotor having a rotor shaft may include providing a multi-phase AC voltage to the multi-phase winding and providing at least one ohmic connection between the rotor shaft and the motor frame including a conductive fluid.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. Throughout the drawings, corresponding reference numerals indicate like or corresponding parts and features.

Figure 1:
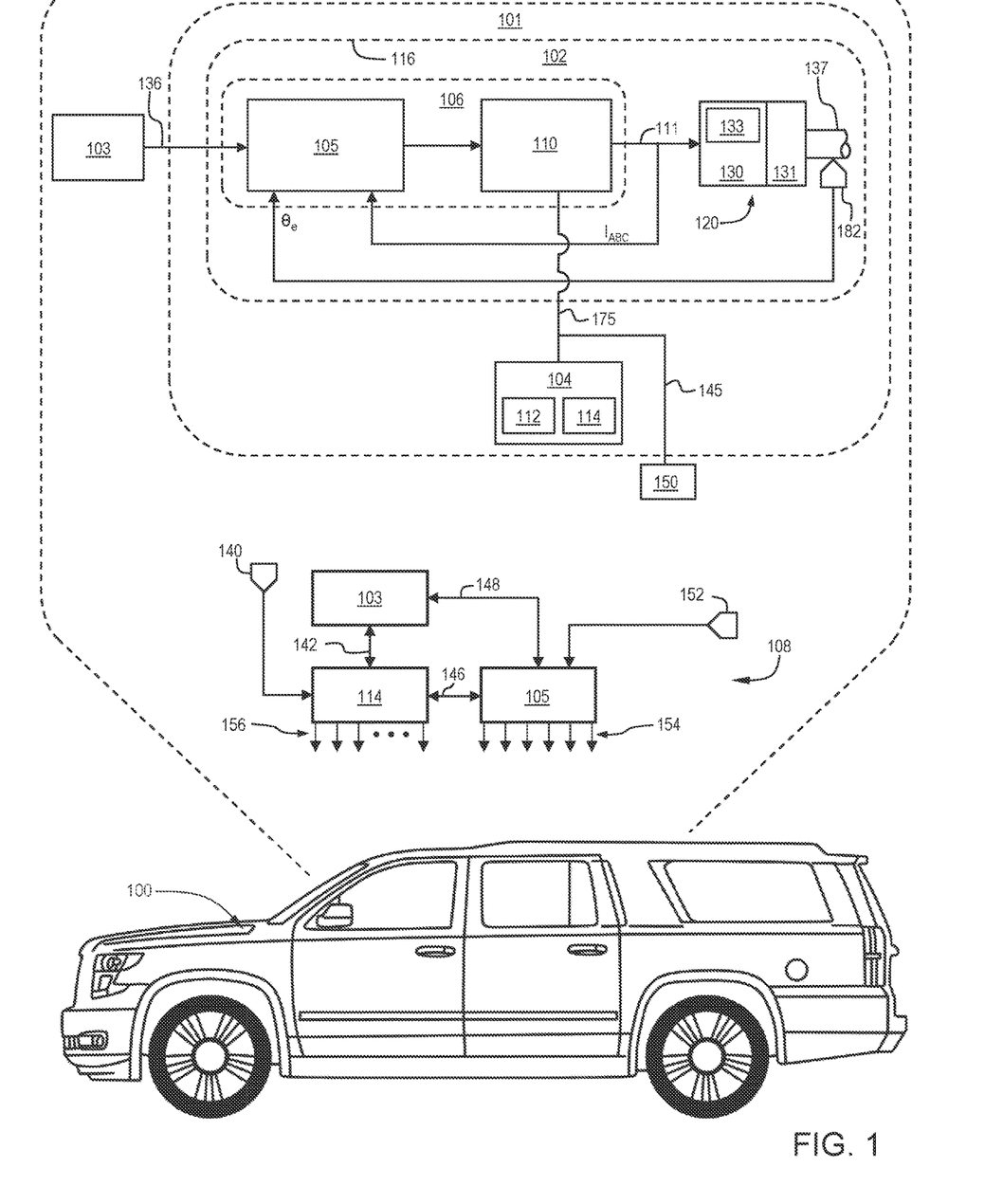
FIG. 1 illustrates an electric propulsion system on a vehicle, in accordance with one or more embodiments.

FIG. 1 schematically illustrates an embodiment of an exemplary electric propulsion system 101 on an electrified vehicle 100. Vehicle and vehicular are understood to refer to any means of transportation including non-limiting examples of motorcycles, cars, trucks, buses, excavation, earth moving, construction and farming equipment, railed vehicles like trains and trams, aircraft, and watercraft like ships and boats. The electric propulsion system 101 may include various control components and electrical and electro-mechanical systems including, for example, a rechargeable energy storage system (RESS) 104 and at least one electric drive unit (EDU) 102. The electric propulsion system 101 may be employed in a powertrain system to generate propulsion torque as a replacement for, or in conjunction with, an internal combustion engine in various electric vehicle (EV) applications and hybrid electric vehicle (HEV) applications, respectively.

The EDU 102 may be of varying complexity, componentry, integration and power capabilities. The EDU 102 may include, for example, an alternating current (AC) motor (motor) 120 and a traction power inverter module (TPIM) 106 including a motor controller 105 and a power inverter 110 which may be contained within or integrated with an EDU housing 116. The motor 120 may be contained within the EDU housing 116 which serves as a motor frame. The motor 120 may include a stator 130 including stator winding 133 and a rotor 131 coupled to a rotor shaft 137 and a position sensor 182, for example a resolver or an encoder. The position sensor 182 may signally connect directly to the motor controller 105 and is employed to monitor angular position of the rotor ($\theta_e$) of the motor 120. The angular position of the rotor ($\theta_e$) of the motor 120 is employed by the motor controller 105 to control operation of the power inverter 110 that controls the motor 120.

The rotor shaft 137 may transfer torque between the motor 120 and driveline components (not illustrated) at a drive end of the motor 120, for example a final drive which may include reduction and differential gear sets and one or more axle outputs. The final drive may simply include reduction gearing and a prop shaft output coupling to a differential gear set. One or more axles may couple to the final drive or differential gear sets if separate therefrom. Axle(s) may couple to a vehicle wheel(s) for transferring tractive force between a wheel and pavement. One having ordinary skill in the art will recognize alternative arrangements for driveline components. Propulsion torque requests or commands 136 ($T_{cmd}$) may be provided by a vehicle controller 103 to the motor controller 105 of the TPIM 106 of EDU 102.

In an embodiment, the RESS 104 may include one or more electro-chemical battery packs 112, for example high capacity, high voltage (HV) rechargeable lithium ion battery packs for providing power to the vehicle via a HV direct current (DC) bus 175. An accessory bus 145 may couple to the HV DC bus 175 for providing electrical energy to high voltage accessory loads 150 such as an auxiliary power module (e.g., a power converter to step down higher voltages to lower voltages), an air conditioning electronic compressor and a battery pack heater. The RESS 104 may also include a battery manager module 114. The RESS 104 battery packs 112 may be constructed from a plurality of battery pack modules allowing for flexibility in configurations and adaptation to application requirements. Battery packs may include a plurality of battery pack modules constructed from a plurality of cells allowing for flexibility in configurations and adaptation to application requirements. Battery pack modules may include a plurality of cells allowing for flexibility in configurations and adaptation to application requirements. For example, in vehicular uses, the battery packs 112 and battery pack modules may be modular to the extent that their numbers and configurations may be varied to accommodate a desired energy density or range objective of a particular vehicle platform, intended use, or cost target and in accordance with propulsion and charging functions and flexibility. Selective reconfiguration of the battery packs 112 and the battery pack modules may be by way of controllable switches for opening and closing various electrical paths effective to provide various parallel and series configurations of the battery packs 112 and the battery pack modules. The switches may be implemented as ultra-low voltage drop solid state devices such as MOS controlled thyristors (MCTs), GaN field effect transistors (FETs), SiC junction field effect transistors (JFETs), metal-oxide-semiconductor field-effect transistors (MOSFETs), insulated-gate bipolar transistors (IGBTs) or other low loss devices of suitable voltage and current ratings. The switches may also be implemented using electromechanical relays (EMRs) or a combination of EMRs in parallel with solid state devices to further reduce the on-state conduction losses wherein the solid state device carries the current during switching from on-to-off or off-to-on state of the electromechanical relay to eliminate arcing. The RESS 104 may include a plurality of battery packs 112 each having a nominal battery pack voltage of, for example, 400 volts or 800 volts and being configured in parallel in respective 400 volt or 800 volt propulsion architectures during propulsion and during direct current fast charging (DCFC). The battery packs 112 may also be selectively coupled to the HV DC bus 175 and to charge ports by way of switches. Some or all such switches may be integrated into one or more controllable battery disconnect units (BDU) (not illustrated) or distributed variously within components or subsystems such as the RESS 104. It is understood that the RESS 104 may be reconfigurable at any level of integration including battery pack, battery module and cell levels.

The motor 120 may be a multi-phase AC motor receiving multi-phase AC power over a multi-phase motor control power bus (AC bus) 111 which is coupled to the power inverter 110. In one embodiment, the motor 120 is a three-phase motor and the power inverter 110 is a three-phase power inverter. The power inverter 110 may include a plurality of solid-state switches based on IGBT and power MOSFET devices, for example. The power inverter 110 may couple to DC power provided by the HV DC bus 175 from the RESS 104. The HV DC bus may couple to the power inverter 110, the accessory bus 145 and to other high voltage loads including additional power converters (not illustrated). The motor controller 105 is coupled to the power inverter 110 for control thereof. The power inverter 110 electrically connects to stator phase windings of a poly-phase stator winding of the motor 120 via the AC bus 111, with electric current monitored on two or three of the phase leads thereof. The power inverter 110 is configured with suitable control circuits including paired power transistors for transforming high-voltage DC electric power to high-voltage AC electric power and transforming high-voltage AC electric power to high-voltage DC electric power. The power inverter 110 may employ pulse width modulation (PWM) control to convert stored DC electric power originating in the battery packs 112 of the RESS 104 to AC electric power to drive the motor 120 to generate torque. Similarly, the power inverter 110 may convert mechanical power transferred to the motor 120 to DC electric power to generate electric energy that is storable in the battery packs 112 of the RESS 104, including as part of a regenerative control strategy. The power inverter 110 may be configured to receive motor control commands from motor controller 105 and control power inverter states to provide the motor drive and regeneration functionality.

Control of the power inverter 110 may include high frequency switching of the solid-state switches in accordance with a PWM control. A number of design and application considerations and limitations determine inverter switching frequency and PWM control. Inverter controls for AC motor applications may include fixed switching frequencies, for example switching frequencies around 10-30 kHz and PWM controls that minimize switching losses of the solid-state switches of the power inverter 110.

The electric propulsion system 101 on the vehicle 100 may include a control system 108 including one or more electronic control units (ECU), for example the vehicle controller 103, the battery manager module 114, and the motor controller 105. The control system 108 may be responsible for carrying out functions related to the propulsion system 101 monitoring, control and diagnostics, including RESS charge control or supervision, based upon a plurality of inputs. The vehicle controller 103 may include one or more ECUs and may be responsible for supervising, interpreting various user and environmental inputs, information arbitration, and issuing and receiving control commands and requests to and from various other ECUs, including the battery manager module 114 and the motor controller 105 as illustrated by communication lines 142, 146 and 148. The battery manager module 114 may include one or more ECUs and may receive a plurality of inputs 140 related to the RESS 104 including, for example, voltage, current and temperature at cell, module, pack and RESS levels at various module and pack configurations, and may determine state of charge (SOC), depth of discharge (DOD) state of health (SOH) and other metrics at cell, module, pack and RESS levels at various module and pack configurations. The battery manager module 114 may also communicate with charging infrastructure through charging port control pilot and proximity pilot communications. The battery manager module 114 may be responsible for charge and discharge control, monitoring and diagnostics of the RESS 104, and selective reconfiguration of the RESS through control of a plurality of switches by issuing switch state commands 156 to the switches. The individual state commands may be issued in the form of binary state signals (e.g., 1=on/closed, 0=off/open) from the battery manager module 114. The motor controller 105 may include one or more ECUs and may receive various inputs 152 used in the monitoring, control and diagnosis of the motor 120 and power inverter 110, including phase currents $I_{ABC}$ from respective current sensors and rotor position information from the position sensor 182. The motor controller 105 may control the motor 120 by issuing conduction commands 154 to the power inverter solid-state switches. The individual conduction commands may be issued in the form of PWM signals from the motor controller 105. Any suitable solid-state device may be employed as the inverter solid-state switches including, for example, solid-state relays and transistors such as Si IGBTs, Si MOSFETs, SiC MOSFETs, GaN HEMTs, SiC JFETs, Diamond, Gallium Oxide and other Wide Band Gap (WBG) semiconductor-based power switch devices. Each power inverter solid-state switch may also have an associated anti-parallel diode either as a discrete component or integrated with each solid-state switch. In accordance with one embodiment, the battery manager module 114 may be responsible for monitoring and diagnosis of the RESS 104, for discharge and charge control including during propulsion operation and for electric power transfers from and to off-vehicle power sources, including infrastructure chargers and other vehicles.

The control system 108, including the vehicle controller 103, the battery manager module 114, and the motor controller 105, may include one or more ECUs. Any controller may include one or more control modules. As used herein, ECU, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, and in-plant and service-related networks including for over the air (OTA) software updates. Functions of a control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module may have a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

The disclosed improvements relate to a multi-phase AC motor 120, and may be realized in HEV and EV embodiments of the vehicle 100 without limitation, as well as in non-vehicular applications such as power plants, hoists, mobile platforms and robots, etc. The motor 120 may, for example, be an interior permanent magnet (IPM) machine, a permanent magnet synchronous reluctance (PMSR) machine, a synchronous reluctance (SR) machine, an induction machine, or any AC machine including a multi-phase AC stator.

Figure 2A:
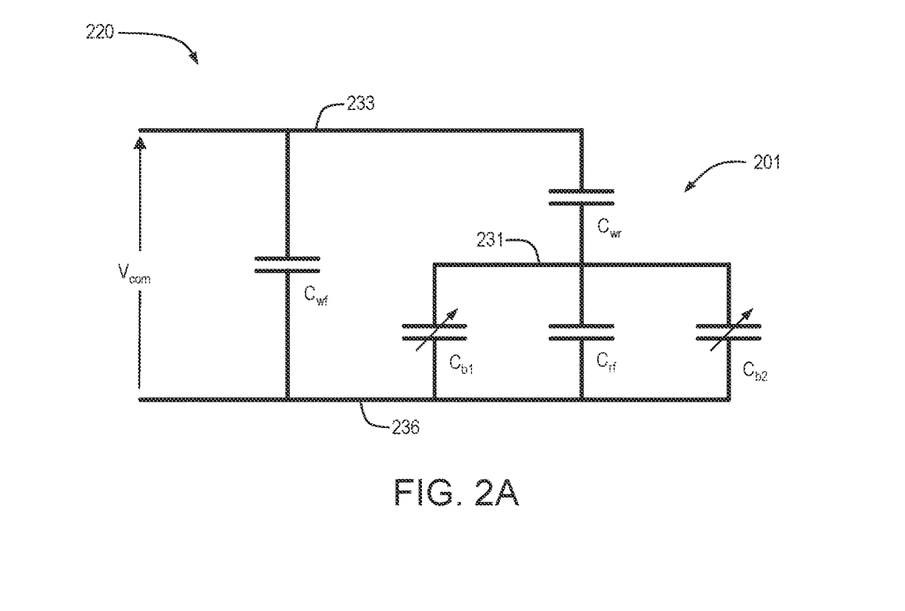
FIGS. 2A-2C illustrate models of a motor of the electric propulsion system, in accordance with one or more embodiments.
Figure 2B:
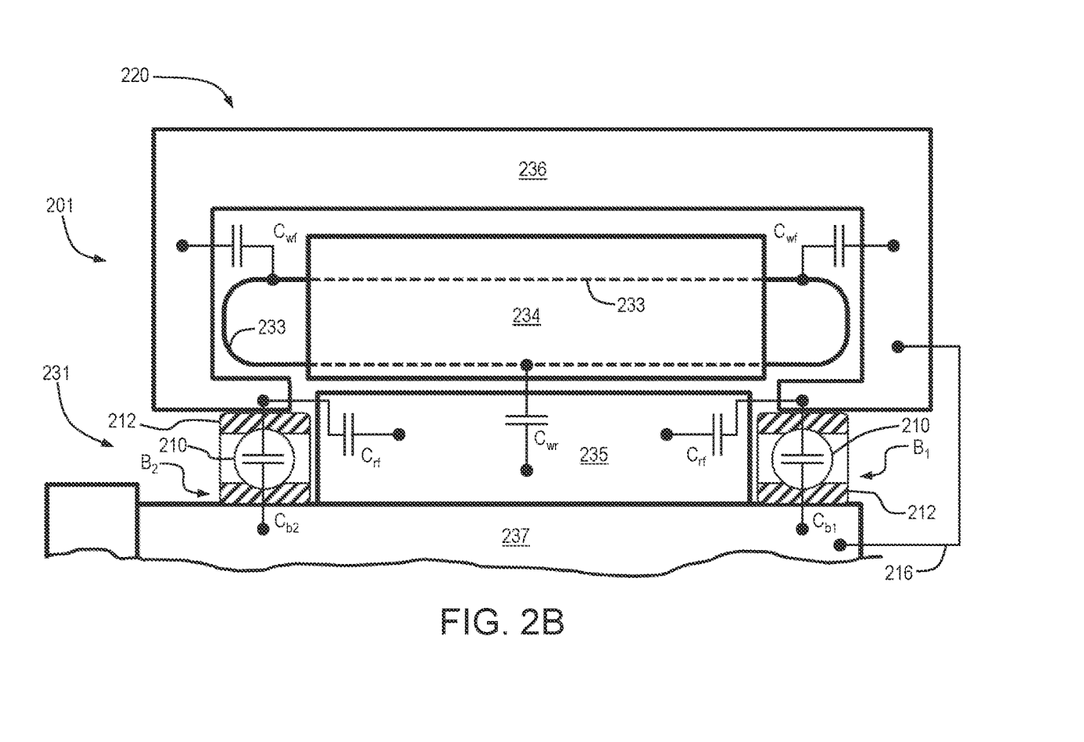
Figure 2C:
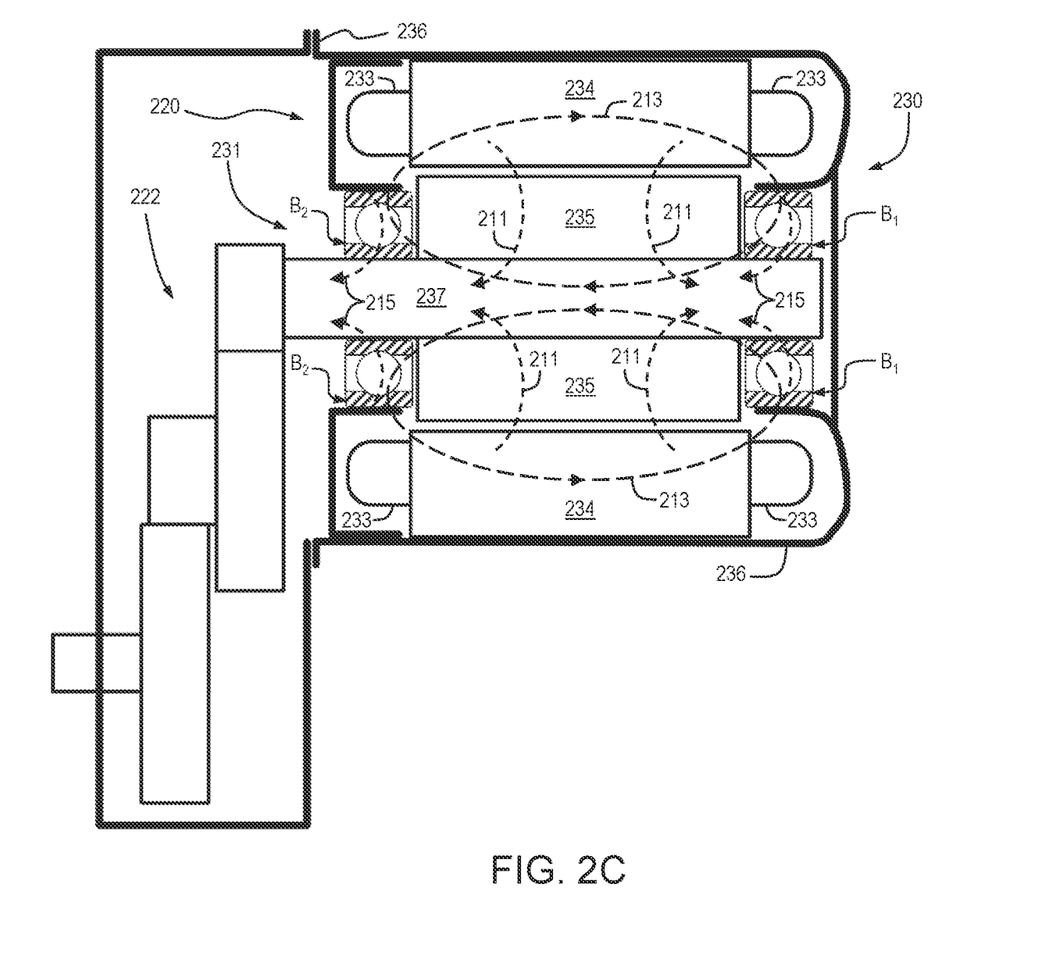

The power inverter 110 operates by synthesizing multi-phase AC voltages which are applied to corresponding phase windings of the multi-phase stator 130 of the motor 120 over the AC bus 111. In addition to the fundamental voltages output onto the AC bus 111, there may be parasitic excitations as a result of non-ideal waveforms. In a balanced three phase system, for example, the three fundamental AC voltages may be substantially sinusoidal and separated by 120 degrees. The summation of the three phase voltages would be equal to zero in an ideal system. However, the power inverter 110 operates by high frequency switching of a DC voltage to synthesize sinusoidal voltages over time. Instantaneous voltages on the AC bus 111 and at the stator phase windings may appear as square waveforms whose summations may not equal zero, thus resulting in high frequency excitations within the motor 120 manifesting in common mode voltages on the stator phase windings. A simplified model of the motor 120 of FIG. 1 is illustrated in FIGS. 2A, 2B and 2C as motor 220, and additional reference is made to those figures. FIGS. 2A and 2B model an impedance network 201 including a plurality of inherent machine parasitic capacitances "C" among major components and excitation voltages $V_{com}$. Impedance as used herein may refer to electrical resistance, capacitance or inductance, though it is understood that capacitive impedance is inversely proportional to capacitance and frequency and inductive impedance is proportional to inductance and frequency. The impedance network 201 may include a winding to frame capacitance $C_{wf}$ from the stator windings 233 in the stator core 234 of stator 230 to the motor frame 236, a winding to rotor capacitance $C_{wr}$ from the stator windings 233 in the stator core 234 to the rotor core 235 and rotor shaft 237 of the rotor 231, a rotor to frame capacitance $C_{rf}$ from the rotor core 235 and rotor shaft 237 of the rotor 231 to the motor frame 236, and bearing impedances $C_{b1}$ and $C_{b2}$ from the rotor core 235 and rotor shaft 237 of the rotor 231 to the motor frame 236 through the bearing $B_1$ and $B_2$, respectively. This impedance network 201 may be excited by the common mode voltages ($V_{com}$) appearing on the AC bus 111 due to the power inverter 110 operation. The FIGS. 2A and 2B model corresponds to motor 220 having a pair of bearings $B_1$ and $B_2$ though additional bearings may be found in other embodiments. Bearings may include rolling elements 210 and race elements 212.

Various induced currents may be present in the power inverter 110 driven AC motor 120 of FIG. 1 and are illustrated by the FIG. 2C model of the motor 220. FIG. 2C additionally schematically illustrates an integrated gearset 222. Capacitive currents 211 through the motor 220 may include low amplitude capacitive displacement currents through the bearing impedances $C_{b1}$ and $C_{b2}$ due to the voltage appearing on the rotor core 235 and rotor shaft 237 of the rotor 231 (between $C_{wr}$ and $C_{rf}$ in FIG. 2A). Ground currents 215 may flow between the stator windings 233 and motor frame 236 creating a circumferential flux through the motor 220 that induces a voltage across the rotor shaft 237 and results in circulating currents 213 flowing through the bearing impedances $C_{b1}$ and $C_{b2}$. As illustrated in FIG. 2C, the circulating currents may flow through the bearing $B_1$ and $B_2$ in opposite directions. Rotor ground currents 215 may flow through the bearing impedances $C_{b1}$ and $C_{b2}$ as stray currents if the impedance of the rotor 231 back to the inverter frame is lower than the stator core 234 back to the inverter frame. Such rotor ground currents 215 may not be significant in systems with short AC bus 111 cable runs, motor frame 236 integrated inverters and shielded AC bus 111 cables. Electrical discharge machining (EDM) currents through the bearing $B_1$ and $B_2$ differ from the capacitive displacement currents as EDM currents are partial discharge currents within and through the bearings which may occur due to changes in the bearing impedance and voltage differences between the rotor shaft 237 and the motor frame 236. Operating factors such as bearing load, speed and temperature may affect changes in the bearing impedance. Also, design factors such as sealed versus hydrodynamic effects of open, oil lubricated bearings may affect changes in the bearing impedance. Transient factors may also affect changes in the bearing impedance and may include rapid load increases, debris and vibration which may cause closing of the rolling element to race gap. Reductions in the bearing impedance may result in effective shorting of the bearings and undesirable discharge of the rotor voltage as EDM currents.

In an embodiment, at least one ohmic connection 216 may be employed to provide a discharge path from the rotor shaft 237 to the motor frame 236 at one or both ends of the rotor shaft 237 though discharge paths may be located at either or both ends of the rotor shaft 237. In an embodiment, the discharge path may be through an electrically conductive fluid. An ohmic connection as used herein means a direct electrical connection for current conduction, rather than a connection via capacitive or inductive effects. Advantageously, an ohmic connection provides a relatively low resistance path for charge from the rotor shaft 237 to the motor frame 236 as compared to typical bearing impedances thus providing a preferential discharge path between the rotor shaft 237 and the motor frame.

Figure 3:
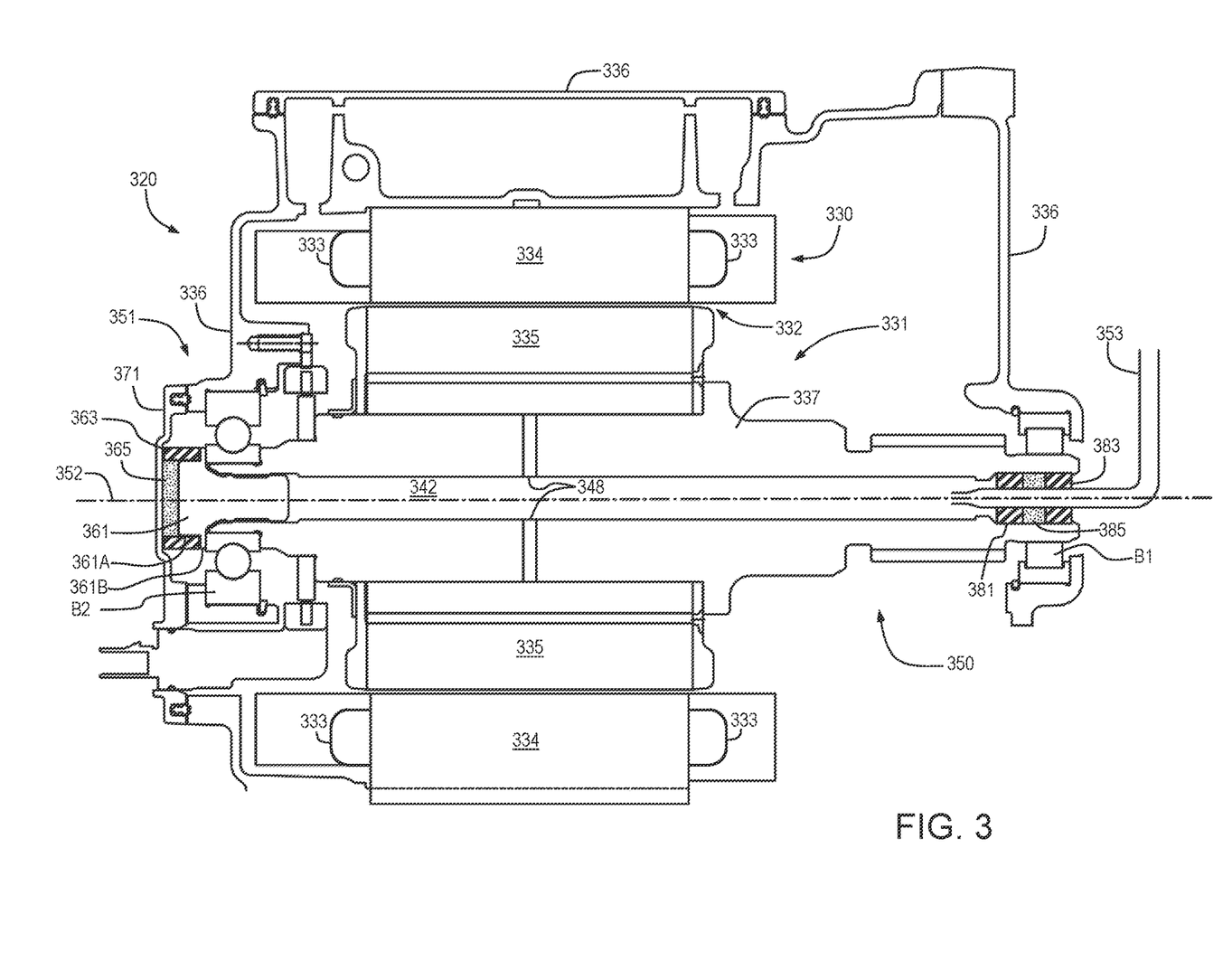
FIG. 3 illustrates a schematic, cross-sectional diagram of an electric propulsion motor, in accordance with one or more embodiments.

Referring to FIG. 3, a schematic, cross-sectional diagram of an electric propulsion motor 320 is illustrated in accordance with an exemplary embodiment. The electric propulsion motor 320 may be one embodiment of a motor as generally described herein with respect to FIGS. 1 and 2A-2C. The electric propulsion motor 320 include a stator 330 with stator core 334, a rotor 331 with rotor core 335, an air gap 332, and a rotor shaft 337.

The stator core 334 may include multiple stacked annular laminations of electrical steel forming a cylindrical core with winding slots toward the interior. The stator core 334 may include multiphase stator windings 333 within the winding slots which receiving multiphase AC from the power inverter to establish a rotating magnetic field. The stator core 334 may be affixed to the motor frame 336, for example with bolts passing through the stator core 334 parallel to the axis of rotation 352 of the rotor 331.

The rotor core 335 may include multiple stacked annular laminations forming a core. In a permanent magnet machine, the stacked laminations may include voids forming interior pockets for carrying permanent magnets. In an induction machine, the stacked laminations may include peripheral slots for carrying conduction bars. Alternative rotor constructions are known to those having ordinary skill in the art and may include, for example, surface mounted permanent magnet and wire wound rotors.

The air gap 332 may provide a physical gap between an inside surface of the stator core 334 and an outer surface of the rotor core 335. In an embodiment, the air gap 332 between the stator 330 and the rotor 331 may be less than a millimeter (mm). In other embodiments, the air gap 332 may be less than 0.5 mm (e.g., 0.2 mm to 0.45 mm). Other sizes of the air gap 332 may be implemented to meet the design criteria of a particular design.

The rotor shaft 337 may be one embodiment of the rotor shaft as generally described herein with respect to FIGS. 1 and 2A-2C. The rotor shaft 337 is affixed to the rotor core 335 and rotates therewith. The rotor shaft 337 may include a bore 342 defining an axial fluid passage and at least one fluid inlet 348 therein (multiple shown). The rotor shaft 337 may be rotatably supported by bearing $B_1$ at a drive end 350 of the rotor 331 and bearing $B_2$ at a non-drive end 351 of the rotor 331 and may transfer the mechanical torque generated by the rotor 320 to driveline components (not illustrated) at the drive end 350. The drive end 350 and the non-drive end 351 are at opposite ends of the rotor shaft 337. The rotor shaft 337 spins about an axis of rotation 352. The axial fluid passage receives pressurized fluid from one end of the rotor shaft 337. From the axial fluid passage, the fluid may flow into the fluid inlet 348 and through passages in the rotor core 335. For example, fluid passages run axially adjacent permanent magnets in an interior permanent magnet machine and fluid flow designed to flow from central fluid inlets 348, through the fluid passages and out at opposite ends of the rotor core 335. Once fluid has been directed through the rotor, it is generally free to flow back to a sump or other area within the EDU for retrieval and recirculation. Fluid may be supplied to the axial fluid passage from a feed tube 353 shown in the embodiment of FIG. 3 at the drive end 350 of the rotor shaft 337.

In an embodiment as shown in FIG. 3, an ohmic discharge path may be employed to provide a discharge path from the rotor shaft 337 to the motor frame 336 at one or both ends of the rotor shaft 337, though discharge paths may be located at either or both ends of the rotor shaft 337. In an embodiment, the discharge path may be an electrically conductive fluid which may be any application suitable conductive fluid. In one embodiment, the conductive fluid may be a saline solution of water. In another embodiment, room-temperature molten salts may serve as the conductive fluid depending upon the application temperature requirements. In another embodiment, the conductive fluid may be conductive nanofluids such as propylene glycol-based ZnO nanofluids. In another embodiment, liquid metals such as gallium or gallium alloys such as gallium-tin alloys and gallium-indium-tin alloys which are liquid at relatively low temperatures may serve as the conductive fluid.

In an embodiment as shown in FIG. 3, the drive end 350 of the rotor 331 may support within the bore 342 of the rotor shaft 337 an inner sealing ring 381 and an outer sealing ring 383. The inner sealing ring 381 and the outer sealing ring 383 may be elastomeric material formed with outer diameters and inner diameters corresponding to respective outer surfaces and inner surfaces. The outer surfaces are sized for sealably engaging the inner wall of the bore 342 at the open, drive end 350 of the rotor shaft 337. The inner surfaces are sized for sealably engaging the outer wall of the feed tube 353 which may supply fluid to the axial fluid passage for circulation through the rotor core 335 as described herein. The inner sealing ring 381 and the outer sealing ring are axially separated thus providing a gap therebetween and between the inner wall of the of the bore 342 and the outer wall of the of the feed tube 353. The gap may contain an electrically conductive fluid 385 as further described herein. The feed tube 353 is also electrically conductive, for example aluminum, copper, steel or other metal alloys. The feed tube is electrically grounded to the motor frame 336. Thus, an ohmic conduction path is established between the rotor shaft 337 and the motor frame via the electrically conductive fluid 385 and the feed tube 353. Alternatively, or additionally, one or both of the inner sealing ring 381 and the outer sealing ring 383 may be formed from an electrically conductive elastomer.

In an embodiment as shown in FIG. 3, the non-drive end 351 of the rotor 331 may include a bolt 361 threadedly engaged with the bore 342 of the rotor shaft 337 and providing retention of the bearing B2 at its inner race to the rotor shaft 337. Alternatively, the bearing B2 may be retained to the rotor shaft 337 by a retention ring or other mechanical means. The bolt 361 may have a head with interior drive features and a smooth, rounded perimeter surface 361A for sealably engaging a sealing ring 363 at a first end. The bolt 361 may also have a flange 361B engaging the bearing B2 on one side facing the rotor shaft 337 and providing a smooth engagement surface opposite the rotor shaft 337 for sealably engaging the sealing ring 363 at the first end. Thus, the sealing ring 363 may sealably engage the head of the bolt 361 on the perimeter surface and/or the flange surface. In alternative embodiments wherein the bolt 361 is not present, the rotor shaft 337 may include a flat terminal end against which the sealing ring 363 may sealably engage. The sealing ring 363 extends beyond the head of the bolt 361 opposite the rotor shaft 337 sufficient to engage an interior surface of a closeout plate 371 at a second end of the sealing ring 363. The closeout plate may be sealably attached to the motor frame 336, forms a portion of the motor frame, and is ohmically coupled thereto. The closeout plate 371 may provide access to the terminal end of the rotor shaft 337 for assembly purposes; however, in other embodiments the sealing plate 371 may be unnecessary for assembly purposes and the sealing ring may extend from the terminal end of the rotor shaft 337 and sealably engage an interior surface of the motor frame 336. The sealing ring 363 may be elastomeric material formed with an inner diameter. The inner diameter is sized for sealably engaging the smooth, round portion of the head of the bolt 361. The sealing ring 363 is also sized for compressive, sealing engagement against the flange surface at one end and against the interior surface of a closeout plate 371 at the other end. The interior surface of the sealing ring 363, the bolt 361 and the interior surface of a closeout plate 371 cooperatively form a gap which may contain an electrically conductive fluid 365 as further described herein. Thus, an ohmic conduction path is established between the rotor shaft 337 and the motor frame via the bolt 361, the electrically conductive fluid 365, and the closeout plate 371. Alternatively, or additionally, the sealing ring 363 may be formed from an electrically conductive elastomer.

Figure 4:
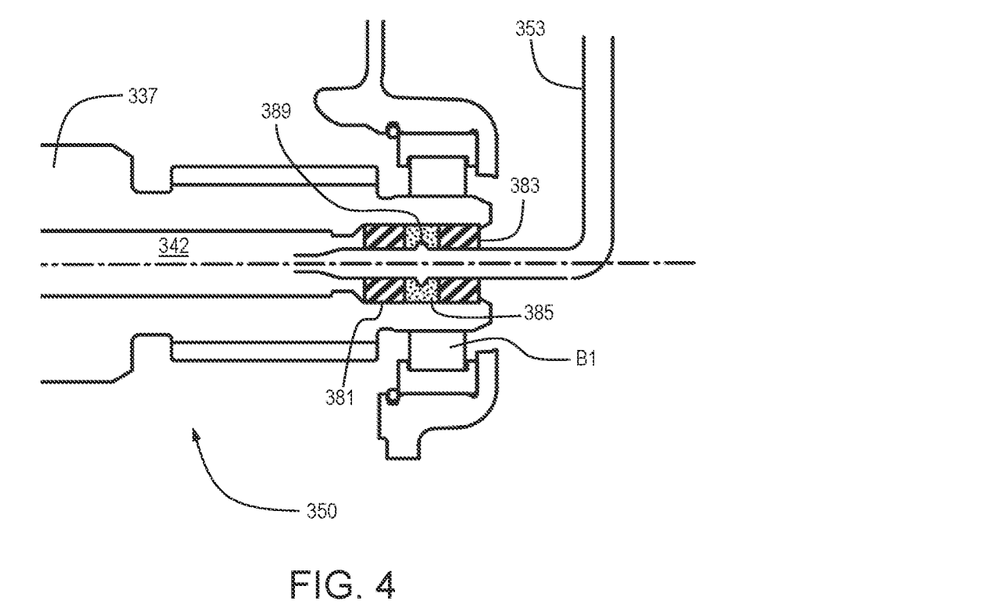
FIG. 4 illustrates an ohmic contact, in accordance with one or more embodiments.

In an embodiment as shown in FIG. 4, the feed tube 353 may be flared 389 in the gap between the inner sealing ring 381 and the outer sealing ring 383. Flaring of the feed tube 353 may advantageously maintain ohmic contact between the electrically conductive fluid 385 and the feed tube 353 in the case where the gap is only partially filled with electrically conductive fluid 385. In such a case, the electrically conductive fluid 353 may collect toward the inner wall of the bore 342 between the inner sealing ring 381 and the outer sealing ring 383 during rotation of the rotor shaft 337 yet not bridge the gap between the inner wall of the bore 342 and the unflared outer wall of the feed tube 353. Flaring of the feed tube locally between the inner sealing ring 381 and the outer sealing ring 383 extends the diameter of the outer wall of the feed tube 353 such that ohmic contact may be maintained with the electrically conductive fluid 353 collected toward the inner wall of the bore 342.

Figure 5:
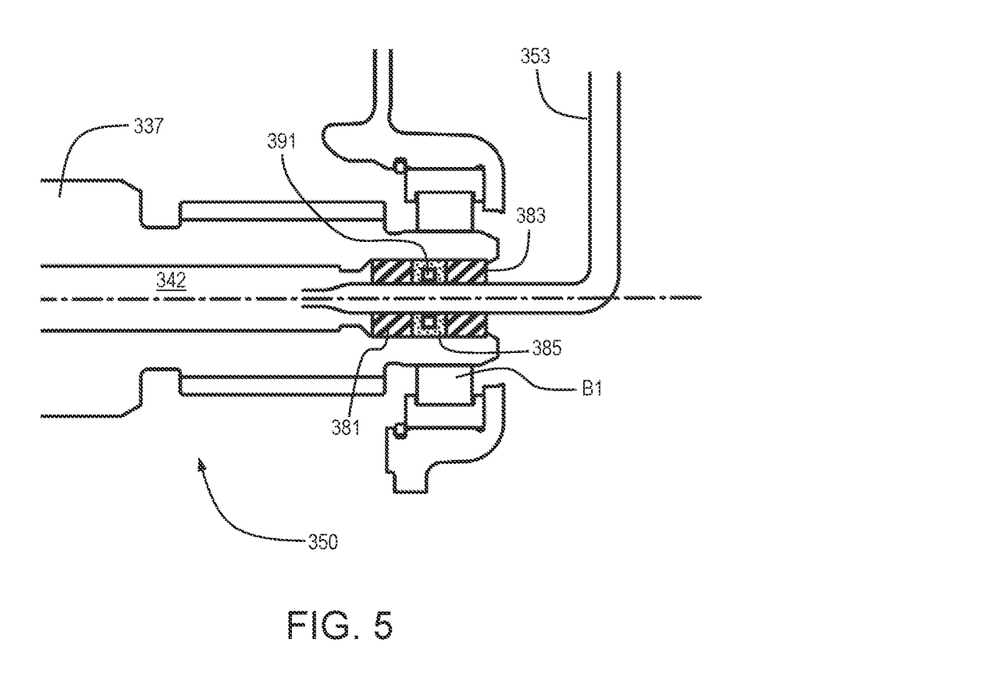
FIG. 5 illustrates an ohmic contact, in accordance with one or more embodiments.

In an embodiment as shown in FIG. 5, an electrically conductive ring 391 may be coupled to the feed tube 353 in the gap between the inner sealing ring 381 and the outer sealing ring 383. The electrically conductive ring 391 may be pressed onto the feed tube with an interference fit. The electrically conductive ring 391 advantageously maintains ohmic contact between the electrically conductive fluid 385 and the feed tube 353 in the case where the gap is only partially filled with electrically conductive fluid 385. In such a case, the electrically conductive fluid 353 may collect toward the inner wall of the bore 342 between the inner sealing ring 381 and the outer sealing ring 383 during rotation of the rotor shaft 337 yet not bridge the gap between the inner wall of the bore 342 and the outer wall of the feed tube 353. The electrically conductive ring 391 between the inner sealing ring 381 and the outer sealing ring 383 extends into the gap from the outer wall of the feed tube 353 such that ohmic contact may be maintained with the electrically conductive fluid 353 collected toward the inner wall of the bore 342.

The terminology used herein is for the purpose of describing particular embodiments only and is not intended to be limiting. The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

When an element such as a layer, film, region, or substrate is referred to as being "on" another element, it can be directly on the other element or intervening elements may also be present. In contrast, when an element is referred to as being "directly on" another element, there are no intervening elements present. Therefore, unless explicitly described as being "direct," when a relationship between first and second elements is described in the above disclosure, that relationship may be a direct relationship where no other intervening elements are present between the first and second elements but may also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Unless defined otherwise, technical and scientific terms used herein have the same meaning as is commonly understood by one of skill in the art to which this disclosure belongs.

Unless specified to the contrary herein, all test standards are the most recent standard in effect as of the filing date of this application, or, if priority is claimed, the filing date of the earliest priority application in which the test standard appears.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An alternating current (AC) motor system, comprising:
 a motor frame;
 a rotor including a rotor shaft;
 a stator including multi-phase AC stator windings;
 a power inverter producing a multi-phase AC voltage coupled to the multi-phase AC stator windings; and
 at least one ohmic connection between the rotor shaft and the motor frame including a conductive fluid;
 a sealing ring sealably engaged at a first end with the rotor shaft and at a second end with the motor frame;
 the conductive fluid;
 wherein the conductive fluid occupies a gap between the first end of the sealing ring and the second end of the sealing ring; and
 wherein the rotor shaft comprises a bolt threadedly engaged with a bore at an end of the rotor shaft, and wherein the sealing ring sealably engaged at the first end with the rotor shaft is sealably engaged with the bolt.

2. The AC motor system of claim 1 wherein the at least one ohmic connection comprises a first ohmic connection and a second ohmic connection located at respective opposite ends of the rotor shaft.

3. The AC motor system of claim 1 wherein the conductive fluid comprises one of a saline solution of water, a molten salt, a conductive nanofluid, and a liquid metal.

4. The AC motor system of claim 1 wherein the at least one ohmic connection comprises:
   a first sealing ring having a respective inner surface and a respective outer surface and a second sealing ring having a respective inner surface and a respective outer surface, the first sealing ring and the second sealing ring disposed in spaced adjacency within a bore at an end of the rotor shaft and sealable engaged at respective outer surfaces with an inner surface of the bore;
   an electrically conductive tube electrically grounded to the motor frame and disposed through the first sealing ring and the second sealing ring and sealably engaged at respective inner surfaces of the first sealing ring and the second sealing ring; and
   the conductive fluid;
   wherein the conductive fluid occupies a gap between the first sealing ring and the second sealing ring.

5. The AC motor system of claim 4 wherein the electrically conductive tube is flared between the first sealing ring and the second sealing ring.

6. The AC motor system of claim 4 further comprising an electrically conductive ring coupled to the conductive tube between the first sealing ring and the second sealing ring.

7. The AC motor system of claim 4 wherein the conductive fluid occupying the gap between the first sealing ring and the second sealing ring only partially fills the gap.

8. The AC motor system of claim 1 wherein the bolt comprises a head with a rounded perimeter surface, wherein the sealing ring sealably engaged with the bolt is sealably engaged with the rounded perimeter surface.

9. The AC motor system of claim 1 wherein the bolt comprises a head with a flange including a smooth engagement surface opposite the rotor shaft, wherein the sealing ring sealably engaged with the bolt is sealably engaged with the engagement surface.

10. The AC motor system of claim 1 wherein the conductive fluid occupying the gap between the first end of the sealing ring and the second end of the sealing ring only partially fills the gap.

11. The AC motor system of claim 1 wherein the motor frame comprises a closeout plate, and wherein the sealing ring sealably engaged at the second end with the motor frame is sealably engaged at the second end with the closeout plate.

12. An electrified vehicle, comprising:
   a battery pack;
   a traction power inverter module (TPIM) connected to the battery pack, and configured to change a direct current (DC) voltage from the battery pack to a multi-phase alternating current (AC) voltage; and
   a rotary electric motor energized by the multi-phase AC voltage from the TPIM over a multi-phase AC bus, comprising:
   a motor frame;
   a stator having multi-phase AC stator windings;
   a rotor;
   a rotor shaft connected to and surrounded by the rotor, and configured to rotate about an axis of rotation in conjunction with the rotor when the rotary electric motor is energized;
   a transmission coupled to the rotor shaft and powered by the rotary electric motor;
   at least one ohmic connection between the rotor shaft and the motor frame including a conductive fluid;
a first sealing ring having a respective inner surface and a respective outer surface and a second sealing ring having a respective inner surface and a respective outer surface, the first sealing ring and the second sealing ring disposed in spaced adjacency within a bore at an end of the rotor shaft and sealable engaged at respective outer surfaces with an inner surface of the bore;
   an electrically conductive tube electrically grounded to the motor frame and disposed through the first sealing ring and the second sealing ring and sealably engaged at respective inner surfaces of the first sealing ring and the second sealing ring; and
   wherein the conductive fluid occupies a gap between the first sealing ring and the second sealing ring.

13. The electrified vehicle of claim 12 wherein the at least one ohmic connection comprises:
   a sealing ring sealably engaged at a first end with the rotor shaft and at a second end with the motor frame; and
   the conductive fluid;
   wherein the conductive fluid occupies a gap between the first end of the sealing ring and the second end of the sealing ring.

14. The electrified vehicle of claim 12 wherein the electrically conductive tube is flared between the first sealing ring and the second sealing ring.

15. The electrified vehicle of claim 12 further comprising an electrically conductive ring coupled to the electrically conductive tube between the first sealing ring and the second sealing ring.

16. The electrified vehicle of claim 12 wherein the at least one ohmic connection comprises a first ohmic connection and a second ohmic connection located at respective opposite ends of the rotor shaft.

17. The electrified vehicle of claim 12, wherein the rotor shaft comprises a bolt threadedly engaged with a bore at an end of the rotor shaft, and wherein the sealing ring sealably engaged at the first end with the rotor shaft is sealably engaged with the bolt.

18. The electrified vehicle of claim 17 wherein the bolt comprises a head with a rounded perimeter surface, wherein the sealing ring sealably engaged with the bolt is sealably engaged with the rounded perimeter surface.

19. The electrified vehicle of claim 17 wherein the bolt comprises a head with a flange including a smooth engagement surface opposite the rotor shaft, wherein the sealing ring sealably engaged with the bolt is sealably engaged with the engagement surface.

20. A method of operating a multi-phase alternating (AC) motor including a motor frame, a stator having a multi-phase winding, and a rotor having a rotor shaft, comprising:
   providing a multi-phase AC voltage to the multi-phase winding; and
   providing at least one ohmic connection between the rotor shaft and the motor frame including a conductive fluid;
   wherein the at least one ohmic connection comprises:
   a first sealing ring having a respective inner surface and a respective outer surface and a second sealing ring having a respective inner surface and a respective outer surface, the first sealing ring and the second sealing ring disposed in spaced adjacency within a bore at an end of the rotor shaft and sealable engaged at respective outer surfaces with an inner surface of the bore;
   an electrically conductive tube electrically grounded to the motor frame and disposed through the first sealing ring and the second sealing ring and sealably engaged at respective inner surfaces of the first sealing ring and the second sealing ring; and the conductive fluid;
wherein the conductive fluid occupies a gap between the first sealing ring and the second sealing ring.

\* \* \* \* \*